United States Patent
Lynch, Jr.

[11] Patent Number: 5,964,434
[45] Date of Patent: Oct. 12, 1999

[54] CABLE SUPPORT AND METHOD

[75] Inventor: Edward J. Lynch, Jr., Akron, Ohio

[73] Assignee: Erico International Corporation, Solon, Ohio

[21] Appl. No.: 08/891,168

[22] Filed: Jul. 10, 1997

[51] Int. Cl.$^6$ .................................................. E21F 17/02
[52] U.S. Cl. ........................... 248/60; 248/68.1; 248/317
[58] Field of Search ................................ 248/58, 59, 60, 248/68.1, 317, 100; 294/152, 156, 74

[56] References Cited

U.S. PATENT DOCUMENTS

| | | | |
|---|---|---|---|
| 1,086,442 | 2/1914 | Cornelius | 248/59 |
| 2,304,973 | 12/1942 | Vecchiola | 248/58 |
| 2,397,433 | 3/1946 | Reeves | 294/156 |
| 2,485,864 | 10/1949 | Cohen et al. | 294/156 |
| 3,167,344 | 1/1965 | Applegarth | 294/152 X |
| 3,425,737 | 2/1969 | Sutton | 294/74 |
| 3,778,095 | 12/1973 | Carr | 294/74 |
| 3,840,262 | 10/1974 | Foster et al. | 294/74 |
| 4,558,896 | 12/1985 | Farnworth | 294/156 |
| 4,699,416 | 10/1987 | Lacey | 294/152 |
| 4,832,393 | 5/1989 | Pitchford | 294/156 |
| 5,096,248 | 3/1992 | Ryan | 294/156 |
| 5,522,571 | 6/1996 | Simmons | 248/60 X |

OTHER PUBLICATIONS

Caddy Fasteners; Caddy Installation Instructions; WMX–6; Multiple Runs of BX from Main Structures; ©1985 ERICO Prod, Inc.

Caddy Fasteners Newsletter No. 184; Apr. 1988; © 1988 ERICO Products, Inc.

Caddy Fasteners Newsletter No. 225; Feb. 1990; © 1989 ERICO Products, Inc.

Caddy Fasteners Newsletter No. 230; Feb. 1990; © 1990 ERICO Products, Inc.

Caddy Fasteners Newsletter No. 238; Feb. 1991; © 1991 ERICO Products, Inc.

Caddy Literature; © 1991 ERICO Products, Inc.

*Primary Examiner*—Derek J. Berger
*Attorney, Agent, or Firm*—Renner, Otto, Boisselle & Sklar, P.L.L.

[57] ABSTRACT

A fireproof cable loop forming strap of substantial width has pockets at each end and may have one intermediate pocket to receive front and rear spreader bars which project beyond the lateral edges of the strap. The projecting ends of the bars are configured to be received in hook tabs projecting from the face of a hanger plate or yoke. The rear spreader bar interfits with the plate or yoke and is preassembled therewith so it cannot be removed. The fireproof strap may be formed of fireproof cloth and has folded and sewn lateral edges in addition to the pockets. The hanger plate or yoke may be mounted directly to a variety of structures or surfaces. With an angle flange and intermediate fasteners the hanger may be secured to a wide variety of structures.

35 Claims, 4 Drawing Sheets

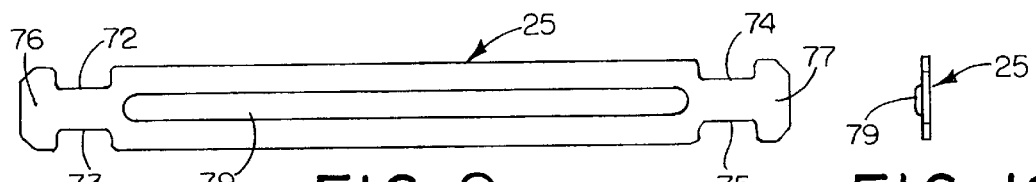
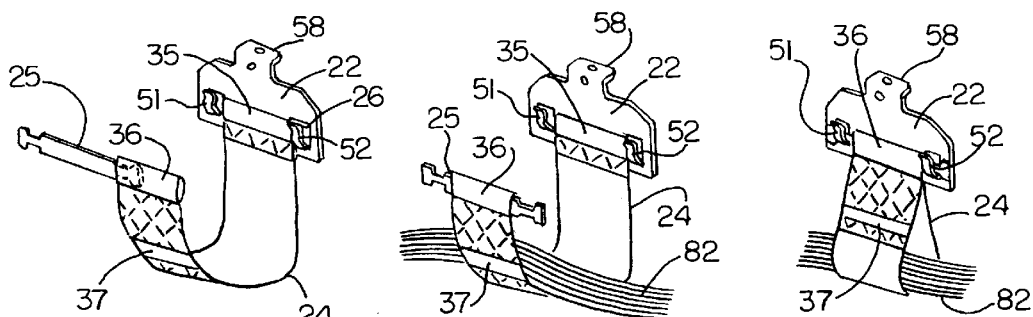
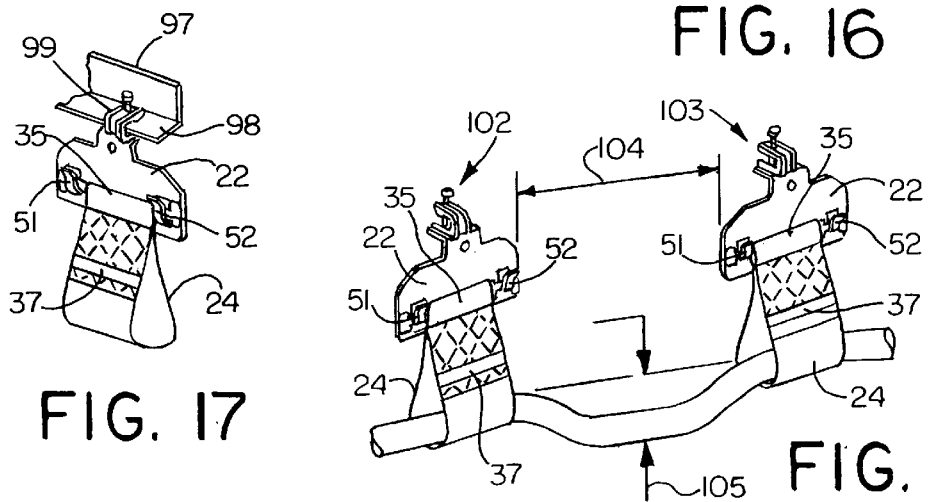

CABLE SUPPORT AND METHOD

DISCLOSURE

This invention relates generally as indicated to a cable support and method and more particularly to a cable supporting strap or sling system for supporting and organizing category 5 cable and other high performance communications cable, including fiber optic cable.

BACKGROUND OF THE INVENTION

UTP category 5 cable is a data or communications cable constructed of 4 unshielded twisted pairs of 24 AWG thermoplastic insulated conductors enclosed is a thermoplastic jacket. The pairs of copper wires are tightly twisted to achieve high speed transmission; the tighter the twist, the faster the possible transmission speed. While UTP is available in Category 3, 4 or 5, the higher the number, the tighter the twist. The tighter twist helps reject electromagnetic interference. While many designers have selected category 3 for voice and category 5 for data, the trend is to install category 5 for all applications in commercial buildings.

As the computer and communications industries have grown, the organization and management of the cabling has become a serious problem. It has literally been dumped on the floor or dropped through walls, kinked around corners, or simply dropped on or dragged over the top of suspended ceilings. Cables such as UTP cables and fiber optic cables simply cannot be treated in such a cavalier fashion and have the equipment they serve meet expectations.

For example cross-talk on a telephone may be due to improper cabling or cable placement. Attenuation, cross-talk, data distortion, and return-loss all affect signal strength which can degrade any system transmission capability. Attenuation is the loss of power or signal strength along the transmission medium. Cross-talk is an unwanted transmission from another nearby cable, or even a pair in the same cable. Return-loss is a measure of degree of impedance between the cable and a connector. Background noise is also an irritating problem resulting from a low signal-to-noise ratio. Inadequate cable installation is a key reason for such factors, especially when data and voice transmission speeds are continually being increased, for example from 16 MHz to 100 MHz or more.

Such cable should not be kinked, snaked, bent sharply, tugged, sag excessively, or come into engagement with sharp edges, or be too close to power cables.

The wiring can be placed under the floor with elevated flooring which is extremely expensive and often not practical. A more common place for such wiring is above the ceiling between the structural floor or roof above, and a dropped or acoustical ceiling.

If the building is being built new and is being designed with such cable in mind, cable trays are often employed. These are simply suspended or cantilevered trays in which such cable can be laid flat to extend horizontally, and are hung or suspended from beams, joists, or decking for example, oftentimes by trapeze hangers. Such trays can be retrofitted into existing buildings, but not easily or economically, particularly if there is not a significant amount or extent of open or unobstructed horizontal space.

The area above many acoustical or drop ceilings is usually cluttered with structural members such as beams or open joists, utilities such as plumbing or sprinkler systems, HVAC ducts, conventional power wiring, often encased in conduit or armored, and of course the suspension hangers for the ceiling and any lighting or other fixtures in the ceiling. Moreover, most beams, joists and other structures extend in a rectilinear fashion above a ceiling, while communications or data cabling usually radiates from a panel or closet in a star topology.

Conventional power wiring clips, snaps, wire hooks, bridle rings, or plastic ties are not suitable for such cable because of a variety of factors. They may present sharp edges or produce sharp turns or kinks in the cabling, or they may crush or pinch a bundle.

Accordingly, there is a need for a category 5 or fiber optic cable support for the careful lay-in installation and organization of large bundles of such voice or data transmission cabling in the utilitarian areas of a building, such as the area above the suspended ceiling and the gridwork thereof, and which can be fastened to or supported directly or indirectly from substantially anything encountered.

SUMMARY OF THE INVENTION

A cable support or hanger is formed of a fireproof non-metallic loop forming strap of substantial width. The strap has pockets at each end and may have at least one intermediate pocket. Front and rear spreader bars extend through the pockets and project beyond the lateral edges of the strap. The projecting ends of the bars are designed to interfit with struck hook tabs on the face of a hanger plate or yoke. The rear spreader bar includes projections adapted to project through holes in the hanger plate or yoke from which the hook tabs are struck. After being assembled in the appropriate pocket of the loop strap, the rear spreader bar is mounted on the hook tabs with the projections in the form of end flanges projecting through the holes. The projections are then bent or splayed to extend behind the hole edges, and the rear spreader bar is locked or preassembled to the hanger plate or yoke. It cannot be disassembled without rebending the projections, and since the gauge of the hanger plate or yoke is substantial, this cannot be done casually or inadvertently. With the front spreader bar positioned in one of the other pockets, the strap will simply hang down until looped beneath a bundle of cables, and the projecting ends of the front spreader bar are secured in the relatively deep pockets formed by the struck hook tabs, and literally wedged into place. Although the front spreader bar can be removed from such hook pockets, it cannot be removed casually.

The front spreader bar may be positioned in the intermediate pocket and the excess beyond the intermediate pocket simply folded over to form a loop of smaller size. The strap is preferably formed of a fireproof cloth such as fiberglass and has folded and sewn lateral edges. This not only reinforces the edges but also ensures the edge is not hard and sharp but rather somewhat soft. The non-metallic fireproof strap or sling may have a length of about 1.5 to about 5 times its width. The strap or sling may typically be from less than about 7 to about 12 cm or more in width.

The hanger plate or yoke includes a center top horizontal flange and the configuration provides both a vertical and horizontal surface so that it may be fastened directly to a variety of structures or walls, or to various intermediate clips or clamps, in turn to be supported from a variety of structures such as beams or purlins. The vertical and horizontal surfaces each have a hole to accommodate a rivet or other fastener which may be used as a pivot or swivel for the hanger. With the flange the hanger may be suspended from the underside of a variety of clips, clamps or other structures and swiveled to accommodate a bundle extending in any direction.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 9 is an elevation of the front spanner bar;

FIG. 10 is an end elevation of the front spanner bar as seen from the right hand end of FIG. 9;

FIG. 11 is a reduced scale perspective view of the hanger with the rear end of the strap forming loop preassembled to the hanger plate or yoke and the front spanner bar being inserted in the top or outer pocket;

FIG. 12 similarly illustrates the strap being positioned around a bundle of cables;

FIG. 13 illustrates the front spanner bar attached to the plate or yoke hooks with the strap looping the cable bundle;

FIG. 14 is a view like FIG. 13 but with the bar inserted in the intermediate pocket and attached to the plate forming a smaller loop and supporting a smaller bundle of cables;

FIG. 15 illustrates the loop forming hanger assembly supported from the flange of a beam by the use of one type of clip fastener mounted to the top of the plate;

FIG. 16 illustrates the assembly supported from a beam flange with an intermediate beam flange clamp;

FIG. 17 illustrates the assembly supported from the flange of an angle bar or purlin with another type of clamp; and FIG. 18 illustrates two spaced assemblies with the horizontal spacing generally controlling the vertical extent of cable bundle sag between hanger assemblies.

DETAILED DESCRIPTION OF THE PREFERRED EMBODIMENTS

Figure 1:
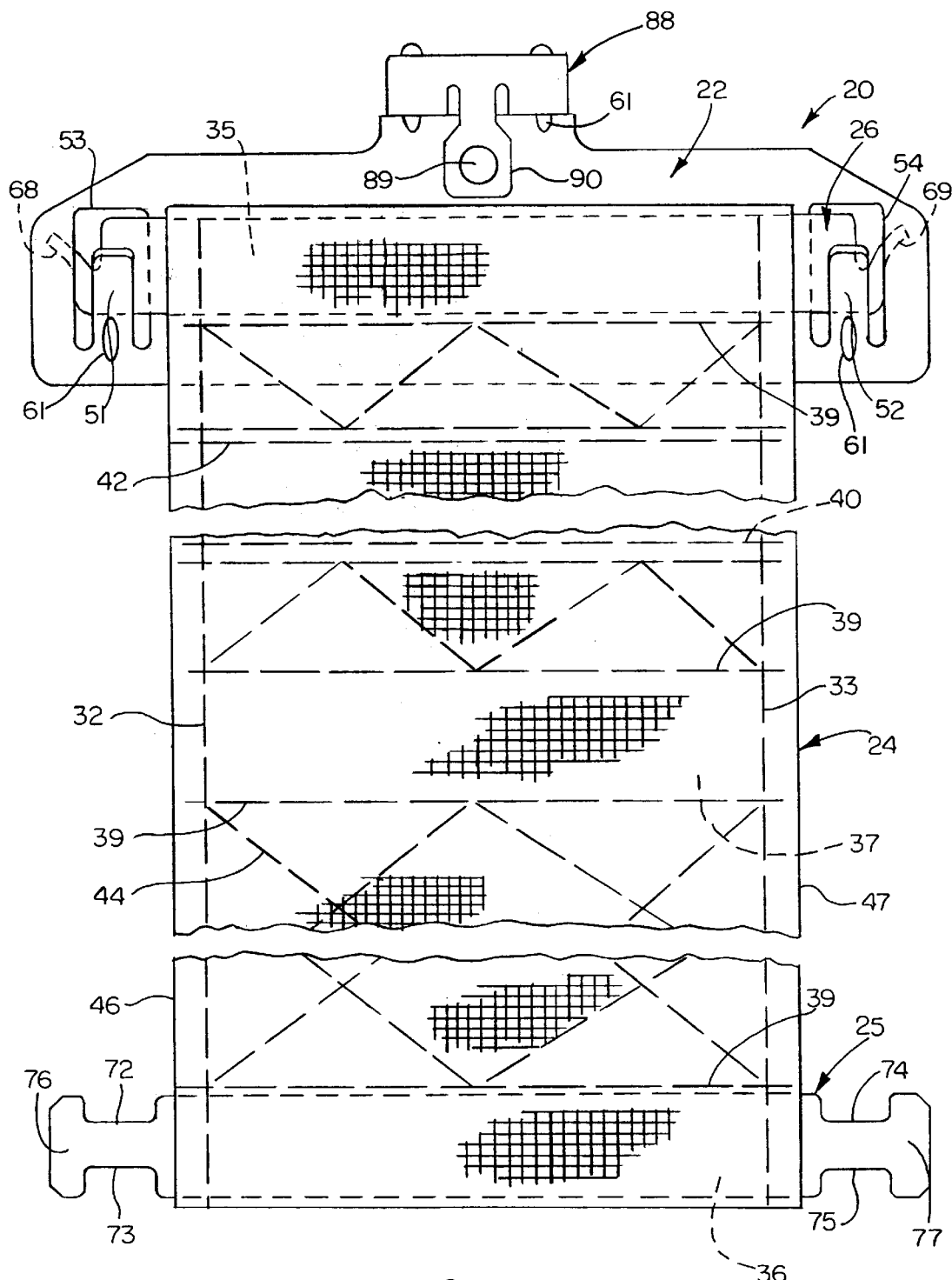
FIG. 1 a front elevation of the cable bundle hanger of the present invention with the rear of the loop forming strap preassembled on the hanger plate or yoke and with the strap partially broken away.
Figure 2:
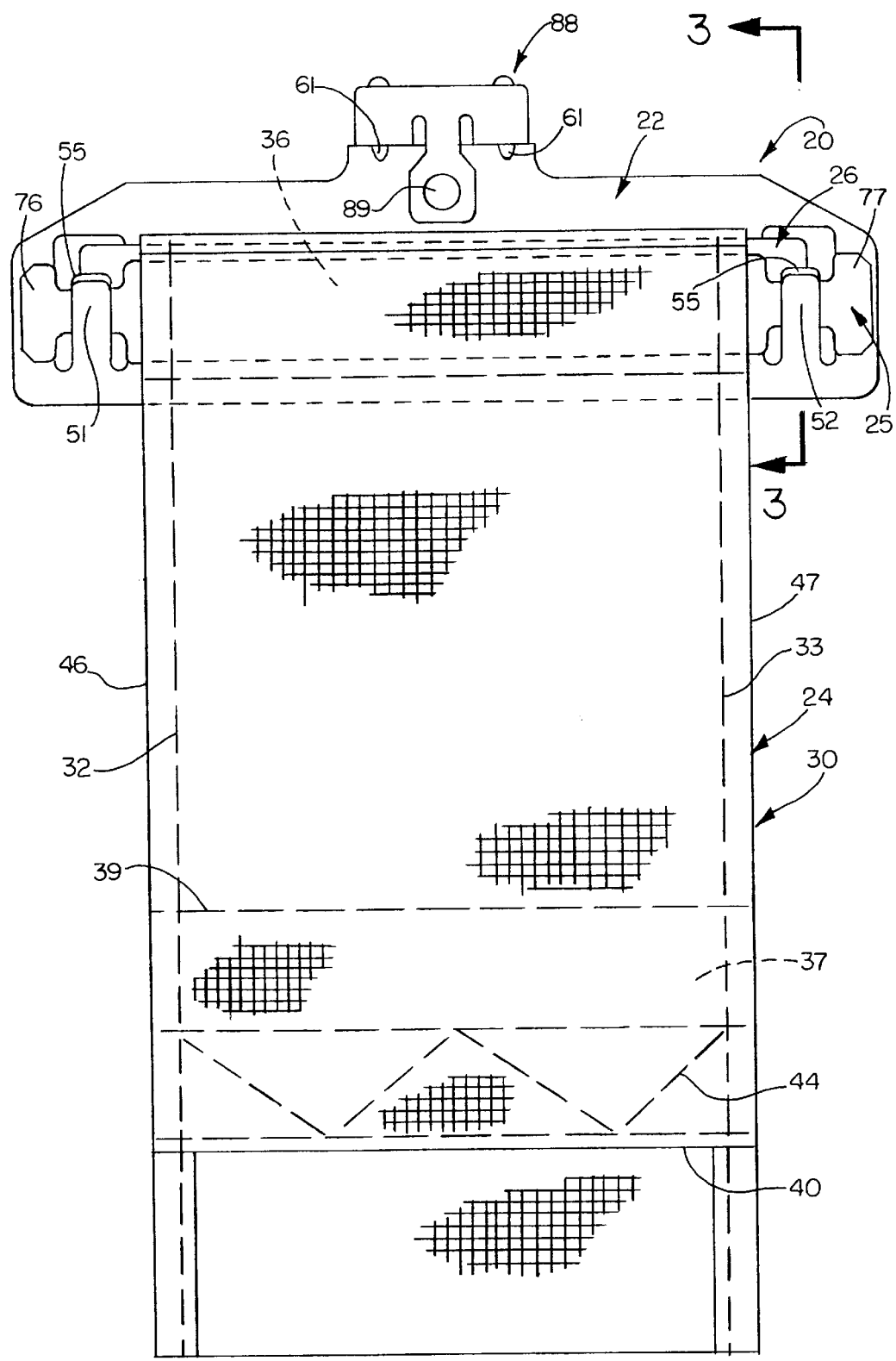
FIG. 2 is a front elevation like FIG. 1 with both ends of the loop forming strap mounted on the hanger plate.

Referring initially to FIGS. 1 and 2 it will be seen that the cable support of the present invention is shown generally at 20 and includes four components or parts which include a plate or yoke 22, a flexible fireproof fabric or cloth strap 24, a front spanner bar 25, and a rear spanner bar 26. FIG. 1 illustrates only the rear bar preassembled to the hanger plate or yoke while FIG. 2 illustrates both in connected and locked position. FIG. 2 illustrates the loop formed, indicated generally at 30, while in FIG. 1 the strap forming the loop or sling is hanging straight down. The length of the strap is about twice that seen in FIGS. 1 and 2.

The strap is formed from a fireproof fabric or cloth such as fiberglass and includes folded and sewn edges or hems seen at 32 and 33. The edges are folded away from the interior of the loop or sling to be formed by the strap. The folded edges provide not only a reinforcement but also a somewhat softer edge which will not bite into the cable or into a plenum guard for fiber optic cable or innerduct.

The strap is longer than it is wide, but nonetheless is of substantial width. For example, the strap may be from about less than 7 cm to about 12 cm or more in width, and the length may be from about 1.5 to 5 times the width. The strap may be formed of a single-ply except where transverse pockets are formed as seen at 35, 36 and 37 in FIG. 1. The pocket 35 is at the rear end of the strap, while the pocket 36 is at the front end. An intermediate pocket is provided at 37. The intermediate pocket 37 is slightly closer to the front end of the strap than to the rear end. The pockets are formed by transverse sewing 39.

The ply from which the strap is made may extend beyond the front pocket indicated at 36 and be folded back to create a double-ply extension ending at 40 and from which the intermediate pocket 37 is made. Similarly, the rear pocket 35 is made by folding back the fireproof cloth from which the strap is made to the point 42 seen in FIG. 1. Where two plies of the cloth exist, diagonal criss-cross stitching such as seen at 44 may be employed to insure that the two plies do not separate. The three pockets 35, 36 and 37 are of the same size and extend completely transversely through the strap and are adapted to receive the spreader bars indicated at 25 and 26. The spreader bars are the same length, and both project laterally beyond the edges 46 and 47 of the strap.

Referring now additionally to FIGS. 3 through 10 it will be seen that the hanger plate or yoke 22 has a front surface 50 from which hook tabs 51 and 52 project. The tabs are struck to extend forwardly from the lower edge of respective rectangular holes 53 and 54. Each hook tab is bent and then rebent to form a slightly outwardly flared tip seen at 55 in FIG. 3. The interior of each hook tab is spaced from the front of the plate to create a support crotch or opening 56 adapted to receive both spreader bars. The hook tabs are spaced horizontally wider than the strap.

The upper edge 57 of the yoke or plate 50 includes a central projection formed into a right angle or horizontal flange 58. The hanger plate or yoke may be made of slightly thicker gauge steel than the spreader bars, and the central holes 59 and 60 may receive a rivet or other fastener for affixing the hanger plate directly to wall or surface or securing the hanger plate to other types of fasteners or brackets as hereinafter described. At the bend, two symmetrical gusset indentations 61 may be formed to strengthen the corner. Such gusset indentations may also be used to strengthen the bottom of each hook tab as shown.

Figure 3:
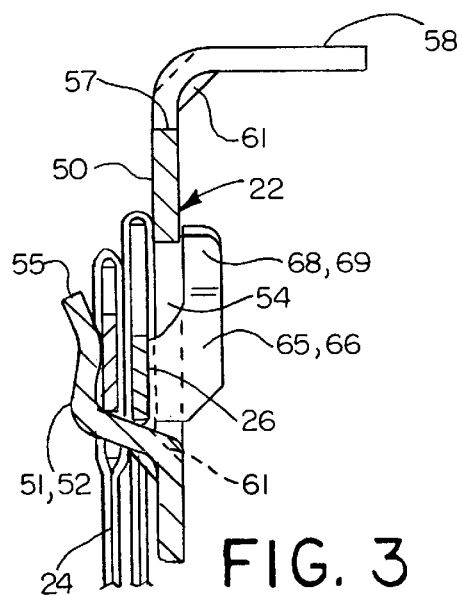
FIG. 3 is an enlarged fragmentary vertical section through the hanger plate as seen from the 3—3 of FIG. 2.
Figure 4:
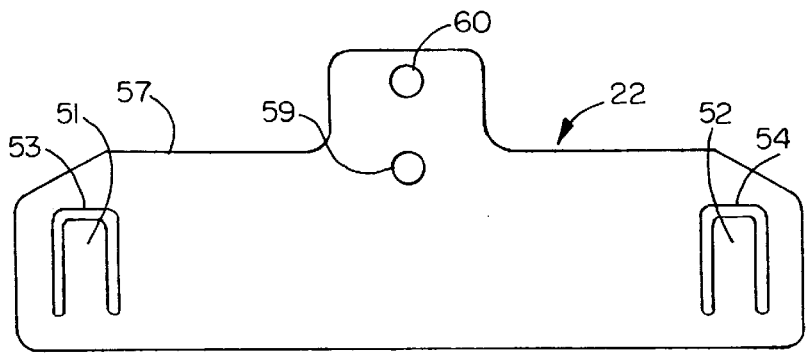
FIG. 4 is a front elevation of the hanger plate on a reduced scale before forming the top flange.
Figure 5:
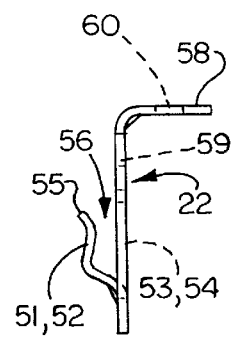
FIG. 5 is an end elevation of the hanger plate as seen from the right hand side of FIG. 4 after forming the top flange.
Figure 6:
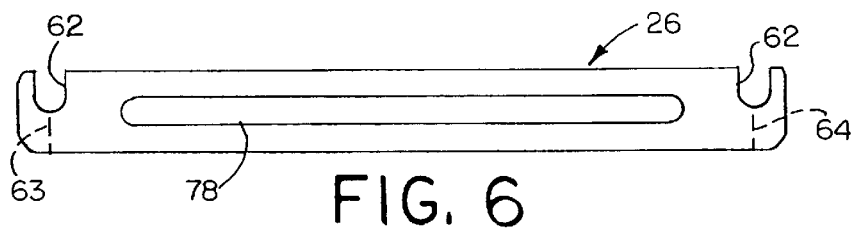
FIG. 6 is a front elevation of the rear spanner bar forming the rear or preassembled end of the strap loop before forming the ends of the bar.
Figure 7:
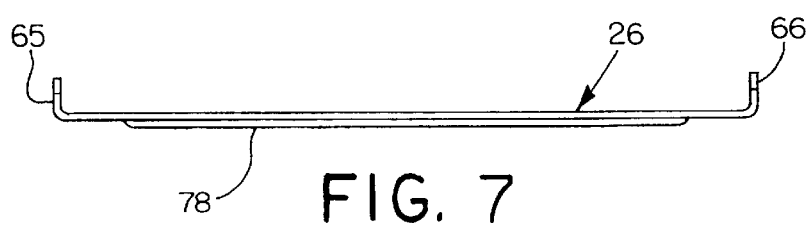
FIG. 7 is a top plan view of the spanner bar of FIG. 6, but after the ends have been bent.
Figure 8:
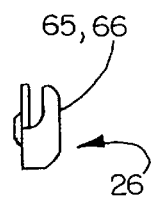
FIG. 8 is an end elevation of the spanner bar as seen from the right hand side of FIG. 7.

The rear spreader bar 26 seen in FIGS. 6, 7 and 8 includes two upwardly opening U-shape notches 62 in the top edge at the outer ends which project beyond the strap. The bar is bent vertically in the middle of such notches as seen by the bend lines 63 and 64 to create rearwardly extending flanges seen at 65 and 66 in FIGS. 7 and 8. For assembly, the spreader bar 26 is inserted in the pocket 35 with the flanged ends projecting beyond the strap edges. The spreader bar is then inserted inside the hooks 51 and 52 with the flanges 65 and 66 projecting through the holes 53 and 54. The upwardly projecting flange tips seen at 68 and 69 in FIG. 1 are then bent to extend behind the outer edge of the openings 53 and 54 in the splayed fashion indicated. In FIG. 3 the flange tips 68 and 69 are bent toward and away from the viewer, respectively. In this manner the tips of the flanges lie behind the plate or yoke, and the spreader bar 26 cannot be removed without rebending such flange tips. In this manner the rear of the strap and the rear spreader bar 26 are preassembled with respect to the yoke or hanger plate.

The front spreader bar 25 seen in FIGS. 9 and 10 is provided with symmetrical notches in both edges at each end. The symmetrical notches on the left hand side of spreader bar 25 are seen in FIG. 1, 2 and 9, for example, and are indicated at 72 and 73, while on the right hand side at 74 and 75. This provides each end of the spreader bar with somewhat enlarged almost arrow head tips seen at 76 and 77, respectively, to facilitate threading in either the outer or intermediate pockets. The notches are positioned beyond the edge of the strap when the bar is centered in the selected pocket. Both the front and rear spreader bars may be provided with a longitudinally extending central reinforcing rib as seen at 78 and 79, respectively.

The preassembly of the rear spreader bar prevents the installer from inadvertently removing the rear spreader bar first and permitting the loop or sling formed by the strap to open away from the installer or user. With the rear of the sling or strap attached to the yoke, the sling is looped under a bundle of cables with the front spreader bar then being positioned on the yoke in the pockets formed by hooks as seen in FIG. 2. If additional cables are to be included, the front spreader bar must be removed and then looped around a larger bundle. The notches in the front spreader bar keep the spreader bar from moving longitudinally with respect to the hook tabs on the face or front of the yoke. The front spreader bar is easy to insert or remove from the pockets. When both bars are inserted they keep the flexible material of the strap from folding longitudinally and maintain the width of the strap throughout the loop being formed.

With reference to FIG. 11, the front bar 25 is shown being inserted into the front or outer pocket 36 with the rear spreader bar 26 already preassembled in the rear pocket 35 and locked to the hanger plate or yoke 22 as described above. In FIG. 12, the cable support or strap is being looped beneath a bundle of cables indicated at 82, and in FIG. 13, the loop has been formed beneath the bundle, and the front bar has been hooked between the tabs 51 and 52 and the preassembled bar 26.

In comparing FIGS. 13 and 14, it is noted that the front spreader bar is inserted in the intermediate pocket 37, and the interior or excess of the loop or strap is simply folded inwardly as indicated at 84. The loop of FIG. 13 may hold a bit more than twice the number of cables held by the somewhat smaller loop of FIG. 14. The loop is assembled to the projecting hooks on the yoke or hanger plate in the same manner.

Referring to FIG. 15, there is illustrated a relatively small I-beam 86 having a bottom or lower flange 87. The yoke or hanger plate is secured to a hammer-on beam clip indicated at 88 which is secured to the hole 59 in the yoke or hanger plate by rivet 89. The spring clip 88 fits on top of the flange 58 and includes the projection 90 seen more clearly in FIG. 1 through which the rivet 89 extends.

In FIG. 16, there is illustrated a somewhat larger I-beam 93 which includes a bottom flange 94. A screw-on beam clamp 95 is fastened to the flange 58 by a rivet extending through the hole 60. The rivet extending through a vertical axis may act as a swivel pivot permitting the bundle of cables to extend in any substantially horizontal direction from such pivot axis. Similarly, a rivet, pivot or fastener in the front hole 59 may provide some pivot adjustment about the horizontal axis of hole 59.

In FIG. 17 there is illustrated an angle or purlin 97 having a bottom horizontal flange 98. A different type of beam clamp 99 is fastened to the top flange 58 of the yoke and secures the hanger to such flange 98 simply by tightening the clamp-screw illustrated. It will be appreciated that a wide variety of fastening clamps or clips may be attached to either the hole 59 in the vertical wall of the yoke or the hole 60 in the short horizontal flange. With such holes and a variety of intermediate fasteners, the yoke or hanger plate may be secured to substantially any structural member available to extend in any direction for forming proper bundle or innerduct support.

As indicated in FIG. 18, the identical assembly is shown at 102 and 103 and spaced horizontally a dimension 104 to minimize cable sag therebetween as indicated by the dimension 105. Ideally, the assemblies 102 and 103 should be spaced no more than about 122 cm apart to limit the sag dimension to no more than about 30 cm.

It can now be seen that a fireproof cable loop-forming strap of substantial width has pockets at each end and at least one intermediate pocket to receive front and rear spanner bars which project beyond the lateral edges of the strap. The projecting ends of the bars are configured to be received in the crotches formed by the hook tabs projecting form the face of the hanger plate or yoke. The rear spanner bar is preassembled with the plate or yoke so it cannot be removed. The hanger plate or yoke may be mounted directly to a vertical surface such as a wall or stud or to a variety of structures or surfaces with intermediate fasteners.

The hanging system of the present invention readily enables UTP category 5 cable and the like to be organized and properly supported to avoid the many problems outlined above.

To the accomplishment of the foregoing and related ends, the invention then comprises the features particularly pointed out in the claims, these being indicative, however, of but a few of the various ways in which the principles of the invention may be employed.

I claim:

1. A cable bundle and hanger combination for organizing and supporting a bundle of communications cable comprising a yoke, a flexible strap having two ends, and means operative to secure first one end of said strap to said yoke, means then to secure the other end to said yoke after encircling a bundle of cables, to suspend said bundle properly organized and supported from said yoke, said yoke including means to secure said yoke to a structure.

2. A cable bundle and hanger combination as set forth in claim 1 including laterally spaced hooks on said yoke forming a part of said means operative to secure first one and then the other end of said strap to said plate.

3. A cable bundle and hanger combination as set forth in claim 2 including laterally projecting spreader bars in each end of said strap, said spreader bars having projecting ends received in said hooks.

4. A cable bundle and hanger combination as set forth in claim 1 wherein said one end said strap is assembled to said plate before the bundle is encircled.

5. A cable bundle and hanger combination for organizing and supporting a bundle of cables comprising a yoke, a flexible strap operative to form a loop, a spreader at each end of said loop to keep said strap of uniform width, and means to secure first one spreader to said yoke, and means then to secure the other spreader to said yoke to form said loop to encircle said cable bundle and hang it in organized fashion from the yoke.

6. A cable bundle and hanger combination as set forth in claim 5 wherein said strap includes transverse pockets at each end to receive said spreaders and form a loop of one size to encircle a cable bundle.

7. A cable bundle and hanger combination comprising a yoke, a strap having two ends, and first means operative first to secure one end of said strap to said yoke, and second means then to secure the other end of said strap to said yoke to encircle said bundle of cables and suspend said bundle in organized fashion from said yoke, and third means operative to secure said yoke directly or indirectly to a variety of structures to support said cable bundle therefrom.

8. A cable bundle and hanger combination as set forth in claim 7 wherein said one end is assembled to said yoke before said bundle is encircled.

9. A cable hanger as set forth in claim 7 wherein said first means includes a spreader bar extending through a pocket in said strap.

10. A support strap hanger combination with a bundle of communications cable comprising a hanger, a fireproof strap, a transverse pocket at each end, each adapted to recieve a transverse spreading and locking bar for adjacent fastening to said hanger, said strap then forming a cable supporting loop sling having a front and back supporting said bundle in organized fashion from said hanger.

11. A method of supporting and organizing a bundle of communications cable with respect to a support structure comprising the steps of securing one end of a flexible strap to a yoke, looping said strap beneath said bundle of such cable, and securing said strap at one location along said strap to said yoke to form a loop having a front and back, and securing the yoke to said support structure.

12. A method as set forth in claim 11 including the step of optionally securing said strap at two different locations along said strap for optionally forming a loop of two different sizes with the same strap.

13. A method as set forth in claim 11 including the step of first assembling one end of the strap to the yoke before forming said loop.

14. A method as set forth in claim 11 including the step of providing the strap with transverse pockets at each end to receive spreader bars, and securing the spreader bars to the yoke to form the loop.

15. A method as set forth in claim 11 including the step of securing said yoke to one of a variety of intermediate hangers to enable the yoke to be supported by a variety of said support structures.

16. A method as set forth in claim 11 wherein said one end of the strap forms the back of the loop.

17. A method of supporting and organizing a bundle of communications cable with respect to a structure comprising the steps of securing a yoke to said structure, securing one end of a flexible strap to said yoke so that said one end of said strap is supported throughout the strap width, looping the strap beneath said bundle, securing said strap at another location along said strap to said yoke to encircle said bundle and support said bundle from said structure so that said another location is supported throughout its width from said yoke while maintaining the width of the strap throughout the loop being formed.

18. A method as set forth in claim 17 including the step of forming the strap of fireproof material.

19. A method as set forth in claim 18 including the step of folding the edges of said strap.

20. A method as set forth in claim 19 including the step of optionally forming a loop of two different sizes with the same strap by securing said strap at an alternative another location along said strap.

21. A cable hanger for communications cable comprising a plate, a flexible strap having two ends, means operative to secure first one end of said strap to said plate, means then to secure the other end to said plate after encircling a bundle of cables, to suspend said bundle from said plate, laterally spaced hooks on said plate forming part of said means operative to secure first one and then the other end of said strap to said plate, laterally projecting spreader bars in each end of said strap, said spreader bars having projecting ends received in said hooks, and respective holes in said plate from which said hooks are struck.

22. A cable hanger as set forth in claim 21 including projections on one of said spreader bars adapted to project into said holes so the spreader bar cannot be removed.

23. A cable hanger as set forth in claim 22 wherein said hooks are dimensioned to receive both one and the other spreader bars in a tight fit.

24. A cable bundle hanger comprising a yoke, a flexible strap operative to form a loop, a spreader at each end of said loop to keep said strap of uniform width, means to secure first one spreader to said yoke, means then to secure the other spreader to said yoke to form said loop to encircle a cable bundle and hang it from the yoke, said strap including transverse pockets at each end to receive said spreaders and form a loop of one size to encircle a cable bundle, and a transverse pocket in said strap intermediate said transverse pockets at each end whereby said other spreader may be received in said intermediate pocket to form a smaller size loop.

25. A cable bundle hanger as set forth in claim 24 wherein said strap is fabricated from fire resistant cloth.

26. A cable bundle hanger as set forth in claim 25 wherein said strap has a length of about 1.5 to about 5 times its width.

27. A cable bundle hanger as set forth in claim 26 wherein said strap has reinforced edges.

28. A cable bundle hanger as set forth in claim 27 wherein said strap has folded and sewn edges forming said reinforced edges.

29. A cable hanger comprising a plate, a strap having two ends, first means operative first to secure one end of said strap to said plate, and second means then to secure the other end of said strap to said plate to encircle a bundle of cables and suspend said bundle from said plate, said first means including a spreader bar extending through a pocket in said strap, said spreader bar including end projections extending through respective holes in said plate.

30. A cable hanger as set forth in claim 29 wherein said projections are bent after insertion through said holes to secure said one end of the strap to said plate.

31. A support strap hanger for a bundle of communications cable comprising a hanger, a fireproof strap, a transverse pocket at each end, each adapted to receive a transverse spreading and locking bar for adjacent fastening to said hanger, said strap then forming a cable supporting loop sling having a front and back supporting the bundle from said hanger, and an intermediate transverse pocket between said ends adapted to receive a spreading and locking bar whereby a cable supporting loop of smaller size may be formed.

32. A support strap as set forth in claim 31 including means to assemble one locking bar to the hanger before said cable supporting loop is formed.

33. A support strap as set forth in claim 32 including means to fasten said hanger to an intermediate hanger whereby said hanger may be supported from a variety of structures.

34. A support strap as set forth in claim 32 wherein said hanger includes an angle flange, and means to fasten an intermediate hanger to said angle flange whereby said hanger may be supported from a variety of structures.

35. A support strap as set forth in claim 32 wherein said one locking bar forms the back of the loop sling while the other locking bar forms the front of the loop sling.

* * * * *